No. 689,848. Patented Dec. 31, 1901.
F. K. BOOTH.
PIE PRINTER, CRIMPER, AND TRIMMER.
(Application filed Sept. 3, 1901.)
(No Model.)
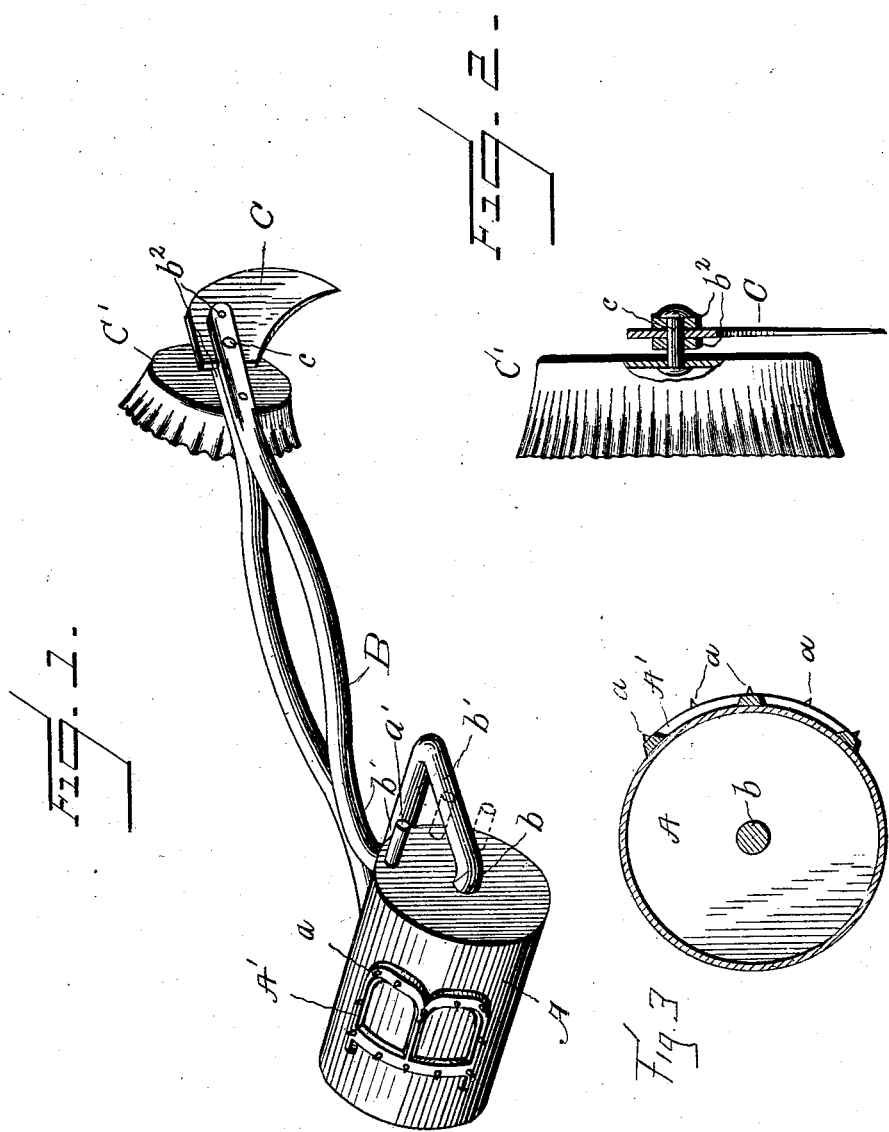
Witnesses
R. A. Boswell
George M. Anderson
F. K. Booth,
Inventor
E. W. Anderson
his Attorney

UNITED STATES PATENT OFFICE.

FREDERICK K. BOOTH, OF REYNOLDSVILLE, PENNSYLVANIA.

PIE PRINTER, CRIMPER, AND TRIMMER.

SPECIFICATION forming part of Letters Patent No. 689,848, dated December 31, 1901.

Application filed September 3, 1901. Serial No. 74,146. (No model.)

*To all whom it may concern:*

Be it known that I, FREDERICK K. BOOTH, a citizen of the United States, and a resident of Reynoldsville, in the county of Jefferson and State of Pennsylvania, have made a certain new and useful Invention in Pie Printers, Crimpers, and Trimmers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of my device. Fig. 2 is a transverse sectional view through the journal-pin of the crimping-roll. Fig. 3 is a transverse section through the printing-roll.

This invention relates to utensils for pie-making, and has for its object the provision of a combined pie printer, crimper, and trimmer of novel, simple, and efficient character, as hereinafter set forth.

Referring to the accompanying drawings, the letter A designates the printer of roll form and having the design A' which it is desired to transfer to the dough in relief thereupon, the lines of the figure or design being sharp and of such depth as to project two-thirds through the dough when pressed thereupon. At intervals points $a$ project beyond the figure or design entirely through the dough to provide vent-holes therein.

B is the handle for the roll, preferably formed of a single wire, as shown, having a straight portion $b$, upon which the roll is journaled, lateral arms $b'$ extending parallel with the end faces of the roll and extending inwardly toward each other at the rear of the roll, and thence outwardly in handle form, the terminations of such wire being approximated and beveled off to comparative thinness. Between the thin terminations of the wire is embraced the trimming-knife C, having a downward projection a little beyond the periphery of the crimping-roll C', which is journaled at one side of such terminations. The journal-pin $c$ of the crimping-roll also passes through the two branches or terminations $b^2$ of the wire handle and through the trimming-knife, aiding in securing such parts together. The peripheral walls of the crimping-roll have an outward flare and are of crimped form.

In use the printer-roll is revolved upon the dough for the pie-crust just after the rolling-pin has reduced such crust to the proper thickness, a lateral projection $a'$ of the roll bearing upon lateral arm $b'$ of the wire support at top and bottom thereof at the beginning and termination of a complete revolution of the roll and indicating when the figure or design of the roll is in proper position to be impressed upon the dough. When the pie is ready for crimping and trimming, the opposite end of the device is employed, the crimper-roll revolving around the edge of the pie and properly crimping the same, the trimmer-knife at the same time cutting off the surplus dough at the edge of the pan.

The entire device is preferably formed of wire and tin.

Having thus described my invention, what I claim as new, and desire to secure by Letters Patent, is—

1. In a pie printer, crimper and trimmer, the printer-roll, the journal-bearing and handle for said roll formed of a single piece of wire or metal, the trimmer-knife embraced between the approximated terminations of said wire, and the crimper-roll journaled adjacent to said trimmer-knife, substantially as specified.

2. In a pie-printer, the printer-roll, the handle for said roll provided with the forks between which the roll is journaled, said roll having a lateral projection arranged to bear upon one of the forks of the handle at the beginning and termination of a rotation, substantially as specified.

3. In a pie-printer, the printer-roll having the design or figure in relief thereupon, and points projecting beyond said figure or design at intervals, substantially as specified.

4. In a pie printer, crimper and trimmer, the printer-roll, the journal-bearing, and handle for said roll formed of a single piece of wire or metal having approximated and thin beveled end portions, the crimper-roll of flaring form journaled to said end portions, and the trimmer-knife embraced between said end portions, and projecting beyond said roll adjacent thereto, substantially as specified.

5. A pie printer, crimper and trimmer, having the printer-roll at one end of the handle thereof and the crimper-roll at the other end of the handle thereof, and the stationary edge knife for said crimper-roll for trimming purposes, substantially as specified.

In testimony whereof I affix my signature in presence of two witnesses.

FREDERICK K. BOOTH.

Witnesses:
THOMAS M. REA,
ROBERT SIPLE.